June 16, 1925.
E. J. HIRVONEN
BRAKE
Filed Jan. 18, 1924
1,542,135
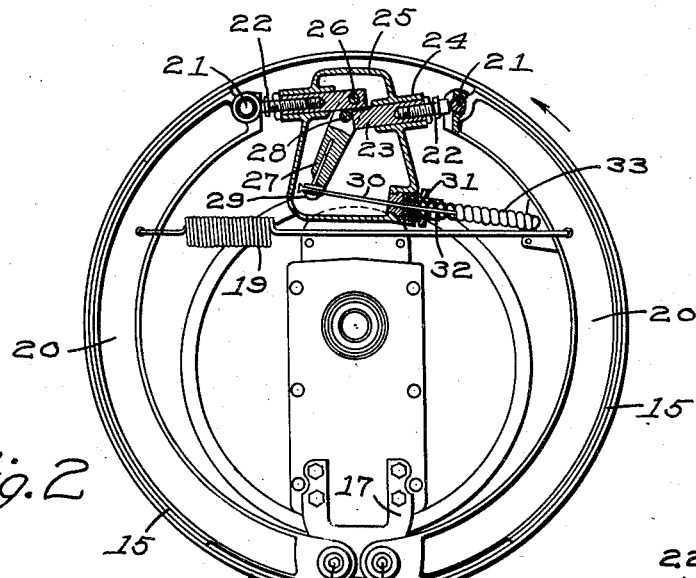
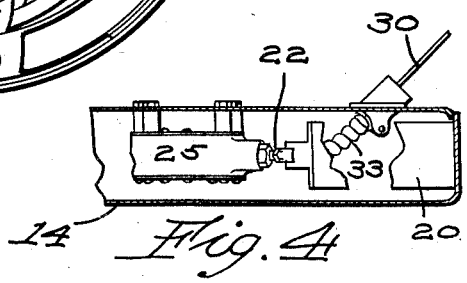
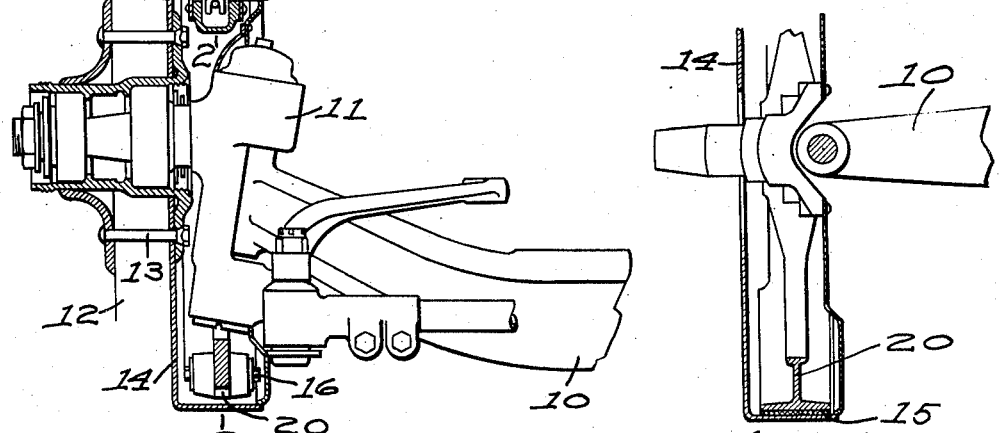
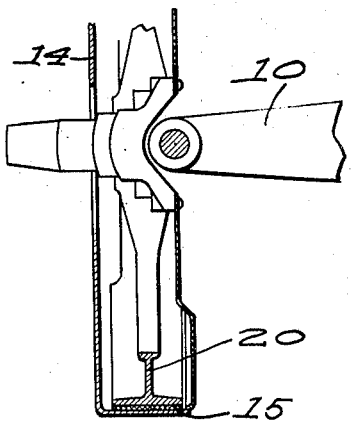

Patented June 16, 1925.

1,542,135

UNITED STATES PATENT OFFICE.

ERIK J. HIRVONEN, OF WORCESTER, MASSACHUSETTS, ASSIGNOR TO LELAND-GIFFORD COMPANY, A CORPORATION OF MASSACHUSETTS.

BRAKE.

Application filed January 18, 1924. Serial No. 687,108.

*To all whom it may concern:*

Be it known that I, ERIK J. HIRVONEN, a citizen of the United States, residing at Worcester, in the county of Worcester and State of Massachusetts, have invented a new and useful Brake, of which the following is a specification.

This invention relates to a brake particularly adapted for the wheels of vehicles and especially designed for application to the front wheels of an automobile.

The principal objects of the invention are to provide an efficient means for lubricating the brake operating mechanism by so designing and arranging it that the said mechanism can be located within a small casing carried by a non-rotary part of the vehicle and adapted to be filled with grease; to operate the brake by means of a flexible connection mounted within a flexible tube communicating with the casing so that this connection and tube will be lubricated by the grease from the casing; and to provide an improved durable equalizing mechanism for forcing apart the shoes of the brake in such a way that either shoe which may be the easier to move will be moved first and when they encounter the same amount of resistance the two shoes will move oppositely together and of such a nature that these parts will work in this way under all ordinary conditions of service and wear.

The invention also involves improvements in the details of construction as will appear.

Reference is to be had to the accompanying drawings in which

Fig. 1 is a front elevation of the end of the front axle of an automobile and illustrating the brake mechanism in vertical central section;

Fig. 2 is a sectional view on the line 2—2 of Fig. 1 of the same;

Fig. 3 is a plan of the axle with the brake mechanism shown in horizontal central section; and Fig. 4 is a plan of a part of the brake operating mechanism with parts broken away to show interior construction.

I have shown the invention as applied to the front axle 10 of an automobile, this axle having the usual knuckle 11 pivoted to the end thereof on an inclined axis. The wheel 12 is shown only in part and does not constitute a part of this invention as the same is applicable to any ordinary type of wheel. Fixed with respect to the wheel by means of bolts 13 is the cylindrical brake casing 14 which therefore rotates with the wheel.

Within the casing 14, are two pivot studs 16 secured to a bracket 17 on the bottom of the knuckle 11 and consequently not rotatable with the wheel. These two pivot studs carry a pair of brake shoes 20. They are provided with the usual external cylindrical braking surface or band 15 formed of any ordinary material suitable for that purpose. The two brake shoes 20 are connected with each other by a spring 19 as shown for the purpose of drawing them away from the friction surface and in opposition to the mechanism for applying the brakes. It will be understood that although I have shown this invention as applied to a two shoe brake, it is not limited in that respect as the same principle is applicable to brakes having different numbers of shoes.

At the opposite free ends of the shoes are studs 21 against which abut adjusting screws 22. Each of these screws is adjustably mounted on the end of a slide 23. These two slides are mounted to fit with a sliding fit in a pair of opposite parallel hubs 24 constituting a part of the grease casing 25 which is adapted to be filled with lubricating grease and intended to be operated in that condition. Pivotally connected by a stud 26 to one of these slides is an operating lever 27. This lever also has a stud 28 at a short distance from the stud 26 and in position to engage the end of the other slide 23 to which the lever is not otherwise connected. The leverage is greater on the non-wrapping side to give more pressure there.

The lever 27 is connected at its opposite end by a ball and socket joint 29 with a cable or other flexible connection 30. At one point, preferably near the bottom of the casing 25, is a hollow screw plug 31 through which the cable 30 passes freely. Inside the outer end of this screw plug 31 is fixed by means of a plug 32 or the like, the end of a flexible armoured metal tube 33. The cable 30 passes through this flexible tube and is free to move longitudinally therein. It extends outwardly at the end and is connected with the ordinary foot treadle, or in any other desired way, it can be operated by the operator of the car to move the cable 30 within the flexible tube.

In operation the manipulation of the foot treadle to draw the cable 30 to the right in Fig. 2 swings the lever 27. As the stud 28 is in contact with one slide 23 and the lever is positively pivoted to the other, this motion forces the two slides outwardly in opposite directions. If one of them meets more resistance than the other the latter will be moved first or at least faster than the other. Its motion will continue until the resistance is substantially equal on the two shoes and then both of them will be forced outwardly at substantially the same rate for the purpose of applying the brake equally on both sides. When the pressure on the foot treadle is released, the spring 19 will draw the two brake shoes apart again and take off the brake.

The casing 25 as stated is filled with grease which is forced in so that it will penetrate into the tube 33 throughout its length and lubricate the cable 30. All the sliding parts therefore are fully lubricated at all times with a comparatively small amount of grease or other lubricant. The application of the power to the brake shoes is equalized in the sense that they will each receive that proportion of the total force that may be necessary to bring them into such position that the two shoes will be applied equally and under equal pressure to the brake lining. The adjustment of the brakes is secured by turning the screws 22 or the slides 23. This constitutes a very simple construction for the purpose desired, insures full lubrication of all the operating mechanism and protects this mechanism from dust, dirt and grit. Therefore its durability is high and a strong leverage is secured for application of the brakes.

Although I have illustrated and described only a single form of the invention, I am aware of the fact that modifications can be made therein by any person skilled in the art without departing from the scope of the invention as expressed in the claims. Therefore I do not wish to be limited to all the details of construction herein shown and described but what I do claim is:—

1. The combination with a wheel, of a brake mechanism therefor comprising a circular brake casing and brake shoes adapted to engage it, of a non-rotary casing mounted within the first named casing, and mechanism for operating the brakes located in the second casing and operating through the walls thereof, said second casing providing means to receive a lubricant for the operating mechanism.

2. The combination with a wheel and axle, and a knuckle pivoted to the axle for carrying the wheel, of a casing fixed with respect to the wheel, a set of brake shoes movably mounted on the knuckle in position for engaging the inner surface of the casing, a grease casing for containing a lubricant fixed with respect to said knuckle, and mechanism for operating the brakes located in said grease casing and adapted to be lubricated at all times by the lubricant therein.

3. In a front wheel brake, the combination with a pivoted knuckle, of a casing mounted thereon, a wheel rotatably connected with the knuckle and having a brake casing surrounding and containing the first named casing, a set of brake shoes pivoted on the knuckle, a pair of slides mounted to extend through the walls of the first named casing and adjustably engaging the ends of the brake shoes, and means inside the first casing for operating said slides to apply a slightly greater pressure to the shoe on the non-wrapping side than to the other.

4. In a brake, the combination with a pair of brake shoes, of a pair of screws pivotally connected to their ends and extending toward each other, a pair of slides adjustably mounted on said screws, a closed lubricant casing having hollow hubs in its opposite walls arranged with substantially parallel axes in which the slides are mounted to move, and a lever within the casing having means for forcing said slides in opposite directions when the lever is operated.

5. In a brake, the combination with a pair of opposite brake shoes, of a pair of slides substantially parallel with each other adjustably connected to said shoes, a closed lubricant casing into which said slides project from opposite sides, a lever within the casing for operating said slides, and connections between the lever and slides for causing any force applied to the lever to be exerted on either or both of the slides according to the resistance which they encounter and for applying substantially equal force to them when they encounter equal resistance.

6. In a brake, the combination with a lubricant casing designed to be filled with a lubricant, a pair of slides projecting through opposite walls of the casing from the interior for operating a pair of brake shoes, a lever within the casing pivoted to one slide and having means for engaging the other slide, whereby the swinging of the lever will move either slide outwardly that encounters less resistance than the other and will move them both outwardly when the resistance is substantially equal, the points at which the lever is arranged to engage or operate the two slides being located near each other and at one end of the lever, a ball and socket joint at the other end of the lever, and means connected with said joint for swinging the lever.

7. In a brake, the combination with a casing designed to be filled with a lubricant, of a pair of opposite slides in the casing for operating a pair of brake shoes, a lever within the casing having a pivot stud for directly pivoting it to one of the slides, and a second stud for engaging the other, said studs being located near one end, whereby the lever can swing about either of them to operate the other slide and can also operate both slides.

8. In a brake, the combination with a casing designed to be filled with a lubricant, of a pair of opposite slides in the casing for operating a pair of brake shoes, a lever within the casing having a pivot stud for directly pivoting it to one of the slides, and a second stud for engaging the other, said studs being located near one end, whereby the lever can swing about either of them to operate the other slide and can also operate both slides, a flexible cable extending into the casing and connected with the opposite end of the lever and a flexible tube surrounding said cable, the casing having a passage through which the cable enters and through which the lubricant from the casing will enter the cable to lubricate the cable.

9. In a brake, the combination with a casing designed to be filled with a lubricant, of a pair of opposite slides in the casing for operating a pair of brake shoes, means within the casing for operating both slides, a flexible cable extending into the casing and connected with the opposite end of the lever and a flexible tube surrounding said cable, the casing having a passage through which the cable enters and through which the lubricant from the casing will enter the cable to lubricate the cable throughout its length.

10. In a brake, the combination with a casing designed to be filled with a lubricant, of means in the casing for operating a pair of brake shoes, a flexible cable extending into the casing and connected with said means, and a flexible tube surrounding said cable, the casing having a passage through which the cable enters and through which the lubricant from the casing will enter the cable to lubricate the cable throughout its length.

11. The combination with a wheel, of a brake mechanism therefor comprising a circular brake casing and brake shoes adapted to engage it, of a casing mounted within the first-named casing and between the movable ends of the brake shoes, and mechanism located in the second casing for operating the brake shoes, said second casing providing means to receive a lubricant for the operating mechanism.

In testimony whereof I have hereunto affixed my signature.

ERIK J. HIRVONEN.